INVENTORS
Willis H. Gille &
John V. Sigford
BY George H. Fisher
ATTORNEY

Fig. 4

Patented May 15, 1945

2,375,988

UNITED STATES PATENT OFFICE 2,375,988

CONTROL APPARATUS

Willis H. Gille, St. Paul, Minn., and John V. Sigford, Wabash, Ind., assignors to Minneapolis-Honeywell Regulator Company, Minneapolis, Minn., a corporation of Delaware Application August 28, 1941, Serial No. 408,594

8 Claims. (Cl. 236—91)

The present invention relates to condition control systems, and particularly to control systems including a condition responsive element having a characteristic variation in impedance in accordance with variations in said condition.

It has long been desired to increase the sensitivity of condition control systems, such as temperature control systems. The principles of operation of extremely sensitive temperature responsive elements such as thermocouples, resistors of material having an appreciable coefficient of resistance, etc., are also well known. The use of such sensitive elements in commercial temperature control systems has been impractical because the changes in such elements in response to changes in temperature are quite small. Hence the means required to amplify such changes in order to produce sufficient amounts of power to control furnaces, cooling systems, etc., have been quite complicated and expensive. It is therefore an object of the present invention to construct an improved condition control system including a sensitive condition responsive element, means for amplifying changes of said element, and control means operated thereby, which shall be more efficient and less expensive than those of the prior art.

It is a further object of the present invention to provide, in such a control system, an improved bridge circuit for connecting a plurality of condition responsive elements so as to secure a control system which is compensated for the variation of a plurality of conditions.

A further object of the invention is to provide, in a bridge circuit including two remotely located condition responsive elements in a single arm thereof, improved means for compensating said bridge circuit for changes in the resistance of the leads connected to said remote elements.

A further object is to provide a condition responsive element for compensating such a control system, and to provide means for securing a non-linear compensating effect from said element. A still further object is to construct a condition responsive non-linear compensating device for a resistance bridge, comprising an element having an appreciable temperature coefficient of resistance and a rheostat operated by temperature responsive means connected in parallel with said element.

Another object of the invention is to construct an improved, sensitive element adapted to be mounted outdoors and arranged so as to be sensitive to temperature, radiant heat, and wind velocity.

A further object is to construct an improved sensitive element for outdoor use consisting of a temperature sensitive element darkened to make it sensitive to radiant heat, such as sunlight. A further object is to construct an improved sensitive element for outdoor use which is heated so as to make it sensitive to wind velocity. A further object is to provide improved means for heating an element connected in a bridge circuit by means of a current flowing through the element itself, wherein the heating current is prevented from disturbing the balance of the bridge circuit.

Another object of the present invention is to provide an improved electronic amplifier which is adapted to receive the output of a bridge circuit in its input circuit and to produce a potential suitable for controlling the operation of a motor in its output circuit.

Another object of the present invention is to provide an electronic amplifier for supplying one phase of a split-phase motor, wherein the phase of the amplifier output current is varied in accordance with the phase of the input current, and wherein means is provided to limit the displacement of said output current phase from a predetermined normal.

A further object of the invention is to construct an amplifier of the type described wherein the phase displacement limiting means consists of an automatic volume control circuit. A further object of the invention is to construct an amplifier of the type described wherein a limitation of the phase displacement of the output current is obtained by supplying the final output stage with unfiltered rectified alternating current.

Another object of the present invention is to provide an improved temperature control system for a building including a first element responsive to temperature, a second element responsive to a condition of a temperature changing means and a third element responsive to outdoor weather conditions.

Another object of the invention is to construct a condition control system including a plurality of condition responsive bridge circuits, control means associated with each circuit to be controlled by the output thereof, and a single amplifier means adapted selectively to connect any of said bridge circuits with its associated control means. A further object is to construct a time operated switching device for successively connecting each of said bridge circuits with its associated control means.

Another object of the invention is to provide an air conditioning system for controlling the air supply to a plurality of zones, including sensitive condition responsive means associated with each zone, air conditioning means associated with each zone, a single amplifier, and switch means for selectively and successively connecting each said condition responsive means to its associated air conditioning means through said amplifier.

Other objects and advantages of my invention will appear from a consideration of the accompanying claims, specifications and drawings in which

Figure 1

Figure 1:
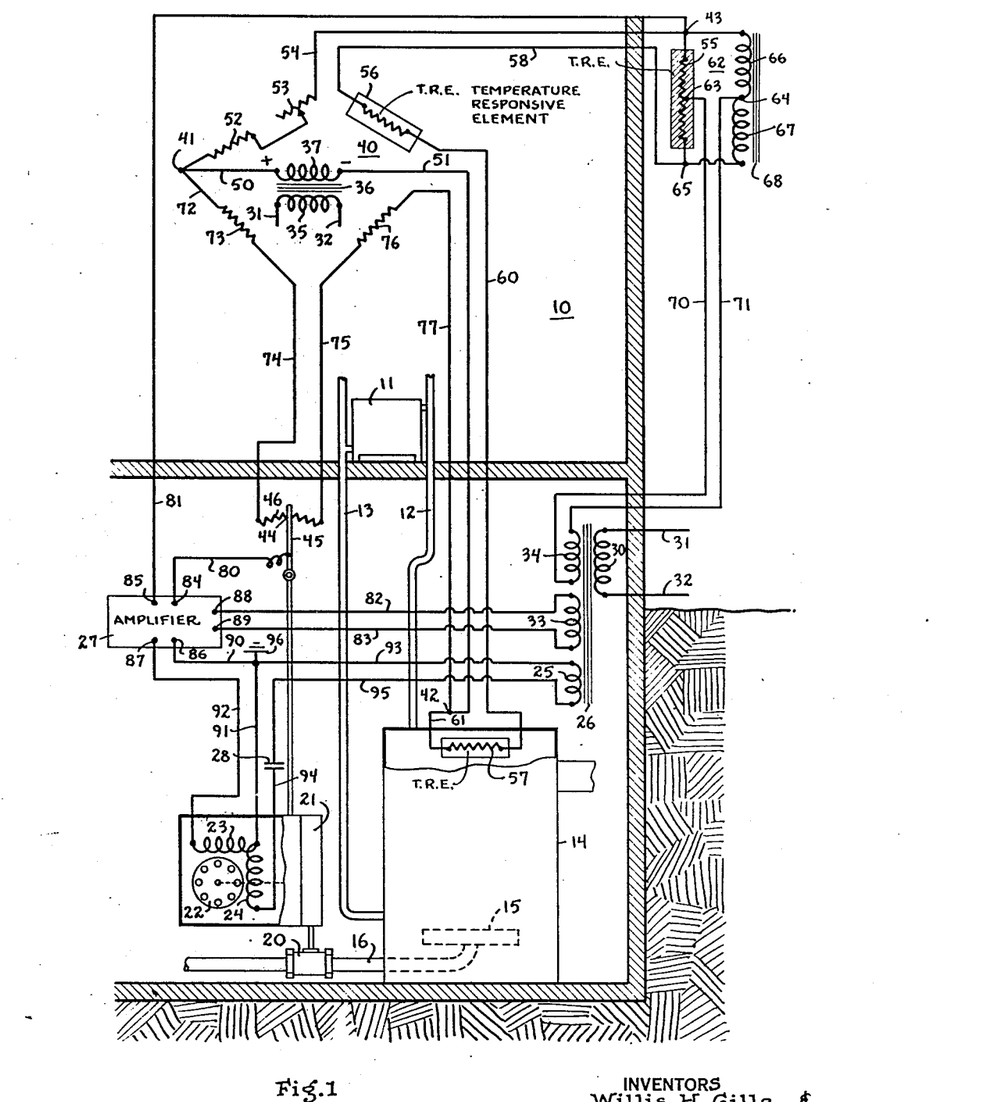
Figure 1 represents a temperature control system embodying certain features of my invention.

Figure 1 shows a space 10 heated by a radiator 11. Heating fluid, which may be, for example, steam or hot water, is supplied to the radiator 11 through a pipe 12 and exhausted fluid is drawn off from the radiator 11 through a return line 13. The fluid is heated by a furnace 14 provided with a burner 15, to which fluid fuel is supplied through a pipe 16.

This supply of fuel through the pipe 16 is controlled by a valve 20 whose position is modulated between open and closed positions by an operating mechanism 21. The mechanism 21 includes a reversible motor 22 of the split-phase type having a pair of field windings 23 and 24. Winding 24 is energized constantly through suitable connections with a secondary winding 25 of a transformer 26. Energization of winding 23 is controlled by an amplifier schematically indicated at 27. Suitable phase shifting means may be connected in series with one of the windings 23 or 24. In the system shown a condenser 28 is connected in series with winding 24.

Transformer 26 is provided with a primary winding 30 connected to power supply lines 31 and 32. In addition to the secondary winding 25, the transformer 26 also has secondary windings 33 and 34. Also connected to the supply lines 31 and 32 is a transformer primary winding 35. Primary winding 35 is a part of a transformer 36 having a secondary winding 37 which supplies a bridge circuit generally indicated at 40.

Bridge circuit 40 has input terminals 41 and 42 and output terminals 43 and 44. Output terminal 44 is the point of contact of a slider 45 with a slide wire resistance 46. Slider 45 is moved along the slide wire 46 by the motor 22 as it operates the valve 20.

Transformer secondary winding 37 is connected to bridge input terminals 41 and 42 by conductors 50 and 51, respectively, thereby forming with said conductors 50 and 51, the input circuit of the bridge 40.

The upper left-hand arm of the bridge circuit 40 connects input terminal 41 with output terminal 43, the latter being located remotely from the bridge circuit 40. This upper left arm includes a fixed resistance 52, a variable resistance 53, and a long conductor 54 connecting variable resistance 53 with the remotely located terminal 43. The function of variable resistance 53 is to adjust the setting of the bridge. That is, by varying the amount of resistance in the upper left arm of the bridge, the resistance necessary in the other arms of the bridge in order to produce a balanced condition is also changed.

The upper right arm of the bridge 40 connects output terminal 43 with input terminal 42 and includes three temperature responsive resistance elements 55, 56 and 57. This arm of the bridge circuit may be traced from terminal 43 through resistance element 55, a conductor 58, resistance element 56, a conductor 60, resistance element 57, and a conductor 61 to input terminal 42.

The temperature responsive resistance element 55 is located outside the building containing the space 10. The function of resistance element 55 is to cause an unbalance of the bridge circuit 40 in accordance with outside weather conditions affecting the operation of the temperature control system. The resistance element 55 may be formed of nickel or some other substance having an appreciable temperature coefficient of resistance, so that its resistance varies directly as the outside temperature.

We have found that by enclosing the resistance element 55 in some substance having a comparatively dark surface, its resistance may be made responsive to radiant energy conditions. For example, in bright sunlight, the dark surface will absorb radiant energy from the sun and cause an increase in the temperature of any elements enclosed within the dark surface. Since the presence of bright sunlight outside decreases the amount of heat which the furnace 14 must supply to the space 10, it is desirable that the operation of the control system be corrected in accordance with the outside radiant heat condition. We have found that by wrapping our outside temperature responsive element in kraft paper of a suitable shade, suitable radiant heat absorptive characteristics are imparted to the element.

It is also desirable that the resistance element 55 be made responsive to wind velocity, as the amount of heat required from the furnace 13 will be greater when a high wind is present outside the building than when the air is comparatively still. We have made the resistance element 55 responsive to wind velocity by heating it artificially. When a high wind is blowing, a large proportion of this artificial heat is carried away from the resistance element 55, thereby decreasing its temperature below normal. The element 55, therefore, reacts to the presence of a high wind in the same manner that it does to a decrease in temperature.

Instead of heating the resistance element 55 externally to make it respond to wind velocity, we find it more convenient to supply heat by means of an auxiliary bridge circuit 62, having input terminals 63 and 64 connected to the terminals of transformer secondary winding 34 by conductors 70 and 71, respectively. Input terminal 63 is the mid-point of resistance element 55. The two ends of element 55 form two of the arms of the auxiliary bridge circuit 62. The other two arms of bridge circuit 62 are formed by a pair of coils 66 and 67 oppositely wound on a common core 68. One terminal of each of the coils 66 and 67 is connected to the input terminal 64 of auxiliary bridge circuit 62. The opposite terminals of coils 66 and 67 are connected to terminals 43 and 65 of temperature responsive element 55. Current flowing in the auxiliary bridge circuit 62 passes through windings 66 and 67 in opposite directions. Since these coils are oppositely wound, the magnetic fluxes produced in the core 68 by the current flowing in the coils 66 and 67 are in the same direction. The coils 66 and 67 therefore offer relatively little impedance to the flow of current in the bridge circuit 62.

The coils 66 and 67 are, however, connected in series with respect to any current flowing in the bridge circuit 40. Since the coils 66 and 67 are wound in opposite directions, any current passing through the two coils in series produces in one coil a magnetic flux which reacts on the other coil to oppose the flow of this same current. It is therefore apparent that the coils 66 and 67 present a substantially infinite impedance to the flow of current from the bridge circuit 40.

It should also be apparent that current from the bridge 62 cannot flow in the bridge 40 as the bridge 62 is always balanced, and as far as the bridge 62 is concerned terminals 43 and 65 are at the same potential. The bridge 62 is always balanced because the coils 66 and 67 are of constant impedance and because any variation in the resistance of element 55 is automatically balanced since half of this resistance is in each of the two adjacent arms of the bridge.

To summarize, the operation of the temperature responsive element 55, it may be stated that any outside weather condition which tends to cause an increase in the heat loss from the space 10, also tends to cause a decrease in the resistance of element 55. Such conditions may be a drop in outside temperature, a decrease in the outside radiant heat, or an increase in wind velocity.

The function of temperature responsive element 55 is to introduce an unbalancing effect into the bridge circuit 40 in accordance with changes in temperature within the space 10. Such changes in temperature within the space 10 indicates the necessity of increasing or decreasing the amount of heat supplied to the space by the furnace 14.

The function of the temperature responsive resistance element 57 is to introduce an unbalance into the bridge circuit 40 in accordance with the temperature of the heating fluid at the output of the furnace 14. This fluid in the furnace 14 will be delivered to the space 10, and a change in its temperature is reflected in the change in resistance of element 57 so that the delivery of the heated fluid to the space 10 is anticipated by the system.

The lower left arm of bridge circuit 40 connects input terminal 41 with output terminal 44 and includes a conductor 72, a fixed resistance 73, a conductor 74, and that part of slide wire resistance 46 between its left-hand terminal and the point of contact 44 of the slider 45.

The lower right-hand arm of bridge circuit 40 connects output terminal 44 with input terminal 42 and includes that part of slide wire resistance 46 between slider 45 and the right-hand terminal of resistance 46, a conductor 75, a fixed resistance 76, and a conductor 77.

A fundamental characteristic of bridge circuit is that, during balanced conditions, the product of the resistances of any two opposite arms of the bridge is equal to the product of the resistances of the other two opposite arms of the bridge. It is customary, when using a bridge circuit to measure the resistance of an element located remotely from the other part of the bridge, to compensate the bridge circuit so that the balance will not be disturbed by the long conductors connecting the remote element with the bridge. This is conventionally done by so connecting the remote element that the two conductors connecting it with the bridge are in different adjacent arms of the bridge. In this way, each of the two pairs of opposite arms contain one of the long conductors. Since these conductors lie physically close to each other practically throughout their length, any change in the ambient temperature of the medium through which they pass affects both arms of the bridge equally and therefore produces no unbalancing effect. Such a connection is conventionally accomplished by locating one of the terminals of the bridge circuit at a point near the remote element, as for example, the terminal 43 in Figure 1. Because of the location of output terminal 43 at this point the conductor 54 is in the upper left arm of the bridge circuit while the conductor 58 is in the upper right arm of the bridge circuit.

It has not previously been realized, however, that complete compensation for the lead resistance could be secured when two remotely located resistance elements were connected in the same arm of a bridge circuit. We have shown such a circuit in Figure 1, in which both resistance elements 55 and 57 are located remotely from the main part of the bridge circuit 40. The manner in which leads 54 and 58 compensate the bridge circuit for each other's resistance has been explained above. With regard to resistance element 57, the lead 77 is in the lower right arm of the bridge circuit while the conductor 60 is in the upper right arm of the bridge circuit. Therefore, the resistance of each of these conductors opposes the effect of the other on the unbalance of the bridge circuit.

This method of compensating for the lead conductors of two remotely located resistance elements in a single arm of the bridge was not previously discovered because it is not obvious that the opposite terminal of the remotely located resistance element must be connected to a conductor which extends back to the location of the main part of the bridge circuit. By opposite terminal of the remotely located element is meant a terminal such as 65 in Figure 1, which is opposite to terminal 43, as far as the resistance element 55 is concerned. In other words, the necessity of using the conductors 58 and 60 of Figure 1 was not previously realized. As far as the applicant's system is concerned, temperature responsive resistance element 55 could be located in the lower left arm of the bridge circuit 40 as well as in the upper right. Regardless of the particular arm in which the resistance element 55 is connected, the conductors 58 and 60, extending physically parallel to the conductors 54 and 77, respectively, between the respective remote resistance elements 55 and 57 and the main part of the bridge circuit, are necessary in order to compensate the bridge circuit for the resistance of the lead.

In bridge circuits of the prior art, whenever two remote resistances were used in a single bridge arm, it was customary to connect the two remote elements directly together. A comparable result would be obtained by connecting our terminal 65 with the right-hand terminal of resistance 57 directly. It should be apparent that such a connection destroys any possibility of compensating the bridge circuit for the lead resistances by the method outlined above.

The above described means for compensating the bridge circuit for the lead resistances is claimed in our copending divisional application Serial No. 560,662, filed October 27, 1944.

Operation of Figure 1

When the parts are in the position shown in the drawing, the bridge circuit 40 is balanced, and the furnace 14 is supplying an amount of heat to the space 10 which is just sufficient to balance the heat losses, thereby maintaining the space at the temperature which the system has been set to maintain by adjustment of the variable resistance 53.

Let it now be assumed that there is a decrease in resistance of one of the three temperature sensitive elements 55, 56 or 57. With regard to outdoor element 55, such a decrease in resistance indicates the existence of a condition which will cause an increased heat loss from the space 10. In the case of resistance element 56, such a decrease indicates the presence of such an increased heat loss. On the other hand, such a decrease in the resistance of element 57 indicates that the amount of heat supplied to the space 10 is about to be decreased. In any event, a decrease in resistance of any one of these three elements indicates that the amount of fuel supplied to the burner 15 should be increased if the temperature of the space 10 is to be maintained at its predetermined value.

For convenience in describing the operation of the system, the instantaneous polarity of the source of electrical energy will be assumed to be that indicated by the legend in the drawings. In that case, any decrease in resistance of the upper right-hand arm of bridge circuit 40 causes the potential of output terminal 43 to become more negative than the potential of output terminal 44. This change in potential of output terminal 43 causes a current to flow in the bridge output circuit in a direction from terminal 44 through slider 45, a conductor 80, amplifier input terminal 84, the input circuit of amplifier 27, amplifier input terminal 85, and a conductor 81 to output terminal 43.

Power is supplied to amplifier 27 from transformer secondary winding 33 through conductors 82 and 83. The current flowing in the input circuit of amplifier 27 produces a greatly amplified current in its output circuit. The amplifier output current energizes winding 23 of motor 22, flowing through a circuit which may be traced from output terminal 86 of amplifier 27 through conductors 90 and 91, winding 23, and a conductor 92 to output terminal 87 of amplifier 27.

Winding 24 of motor 22 is constantly energized through a circuit which may be traced from the upper terminal of transformer secondary winding 25 through a conductor 93, conductor 91, winding 24, a conductor 94, condenser 28, and a conductor 95 to the lower terminal of transformer secondary winding 25. Conductor 91, which is connected to the common terminal of windings 23 and 24, is grounded, as at 96.

Since the winding 24 is directly connected to transformer secondary winding 25, the time phase of current flowing through the winding 24 is fixed with respect to the time phase of the potential supplied by the winding 25. The condenser 28 is chosen so that the current through winding 24 leads the supply potential by approximately 90 electrical degrees. The time phase of the current flowing in winding 23 of motor 22 depends on the time phase of the output current of amplifier 27. The time phase of this output current depends in turn on the time phase of the amplifier input current, which is determined by the instantaneous direction of flow of current between output terminals 43 and 44 of bridge circuit 40. The output current of the bridge 40 may be either in phase or 180 electrical degrees out of phase with the potential supplied from lines 31 and 32. The particular phase relationship depends, as previously stated, upon the instantaneous direction of flow of current between terminals 43 and 44.

During the conditions at present under consideration, it has been indicated that a current is flowing in the output circuit of bridge 40 in a direction from terminal 44 to terminal 43. Let it be assumed that the connections are such that when current is flowing in this direction, it is 180 degrees out of phase with the supply line voltage. The output current of amplifier 27 is likewise approximately 180 degrees out of phase with the supply line voltage. The current in winding 23 therefore differs in phase from the supply current by 180 degrees, while the current in winding 24 leads the supply potential by only 90 degrees. This difference in phase of the current in windings 23 and 24 causes split-phase motor 22 to be driven in such a direction as to open the valve 20 wider. It may therefore be seen that an unbalance of bridge circuit 40 in such a direction as to indicate the need for an additional supply of heat to space 10 causes operation of motor 22 in such a direction as to increase the supply of fuel to the burner 15.

As motor 22 drives the valve 20 in opening direction, it also moves slider 45 to the right along slide wire 46. This motion of slider 45 causes the potential of output terminal 44 to become more negative. The opening motion of valve 20 and the movement of slider 45 to the right continues until the motion of slider 45 has caused a change in potential of output terminal 44 sufficient to balance the change in potential of terminal 43. At that time current ceases to flow in the input circuit of amplifier 27. Current also ceases to flow in the amplifier output circuit and the winding 23 is therefore deenergized, stopping the motor 22.

Now let it be assumed that an increase in resistance takes place in any one of the three temperature responsive elements 55, 56 or 57. This increase in resistance indicates a necessity of decreasing the supply of heat to the space 10, and causes output terminal 43 to become positive with respect to terminal 44. The current therefore flows through the output circuit of bridge 40 in a direction from terminal 43 to terminal 44. This current, flowing through the input circuit of amplifier 27, causes an amplified current to flow in the winding 23 of motor 22. The phase of this current in winding 23 will be opposite that under the conditions previously discussed, because the instantaneous direction of flow through the amplifier input circuit is opposite to that under the previous conditions. The current in winding 23 is therefore in phase with the supply potential. As the current in winding 24 is leading the supply potential in phase by 90 electrical degrees, the motor 22 will operate in a direction opposite to that which it rotated under the previous conditions.

The rotation of motor 22 will therefore cause movement of valve 20 towards closed position and movement of slider 45 to the left along slide wire 46. The movement of valve 20 in a closing direction will decrease the supply of heat to the space 10, and this movement will continue until slider 45 reaches a position such that terminal 44 is at the same potential as terminal 43. When this position is reached, current ceases to flow in the output circuit of bridge 40, winding 23 of motor 22 is therefore deenergized and the motor comes to rest.

It should be apparent to those skilled in the art that the condenser 28, or other phase-shifting means, may be connected in series with either winding of motor 22, without affecting the operation of the system.

Figure 2

Figure 2:
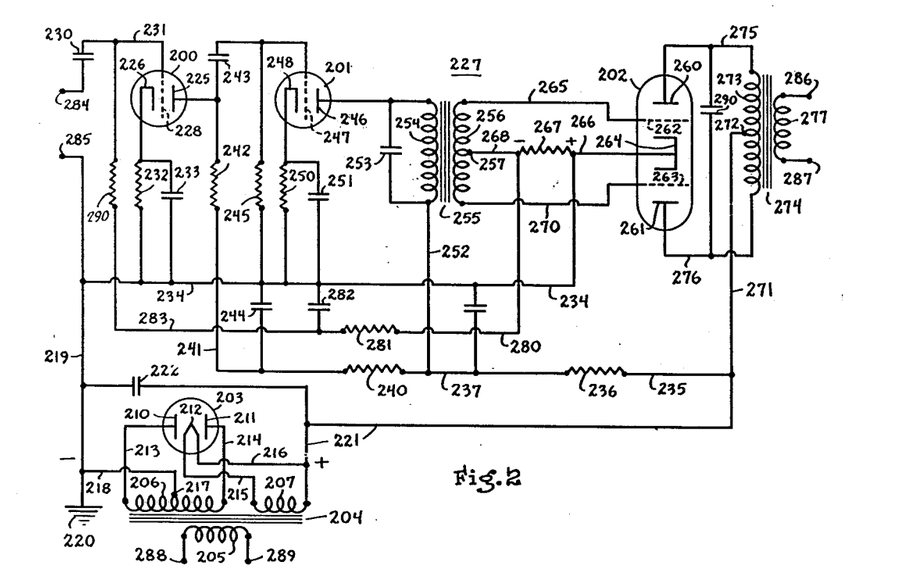
Figure 2 represents an electronic amplifier circuit which may be used in the system of Figure 1.

Figure 2 illustrates an electronic amplifier circuit generally referred to as 227, which corresponds generally to the amplifier 27 of Figure 1, and may be used therefor. The terminals 284 and 285 are the input terminals of the amplifier 227 and correspond to input terminals 84 and 85 of amplifier 26 in Figure 1. Likewise, output terminals 286 and 287 correspond to output terminals 86 and 87 in Figure 1, and power supply terminals 288 and 289 correspond to power supply terminals 88 and 89 of Figure 1.

Amplifier 227 consists generally of two stages of amplification using triodes 200 and 201 connected in said stages with a final push-pull stage of amplification using a twin triode 202. The amplifier 227 also includes a power supply and rectifier circuit of conventional type using a rectifier tube 203.

The power supply circuit includes a transformer 204 having a primary winding 205 and a pair of secondary windings 206 and 207. Primary winding 205 is connected to power supply terminals 288 and 289. The rectifier tube 203 has a pair of anodes 210 and 211 cooperating with a common cathode 212. The anodes 210 and 211 are connected by conductors 213 and 214, respectively, with the opposite terminals of transformer secondary winding 206. Cathode 212 is connected by conductors 215 and 216 to opposite terminals of transformer secondary winding 207. Winding 207 serves merely to heat the cathode 212. Winding 206 alternately applies a positive potential to anodes 210 and 211. The mid-point 217 of transformer secondary winding 206 is connected through a conductor 218 to a conductor 219, the latter being grounded at 220. Cathode 212 is connected through conductor 216 to a conductor 221. The conductors 221 and 219 serve, in a well known manner, as the positive and negative terminals respectively of the amplifier power supply circuit. A filtering condenser 222 is connected between conductors 219 and 221 in order to remove undesirable alternating components, or ripples, from the power supply.

The triode 200 is provided with an anode 225, a cathode 226 and a control electrode, or grid, 228. The input circuit of the first amplification stage, which includes triode 200, may be traced from input terminals 284 through a condenser 230, a conductor 231, grid 228, cathode 226, a biasing resistor 232 in parallel with a condenser 233, a conductor 234, and conductor 219 to input terminal 285. It should be apparent that through this input circuit variations in potential between terminals 284 and 285 are impressed between the grid 228 and cathode 226 of triode 200.

The output circuit of the first amplification stage may be traced from conductor 221 which forms the positive terminal of the amplifier power supply through a conductor 235, a voltage dividing resistor 236, a conductor 237, a voltage dividing resistor 240, a conductor 241, a load resistor 242, anode 225, cathode 226, biasing resistor 232 and the condenser 233 in parallel therewith, and conductor 234 to conductor 219 which forms the negative terminal of the power circuit. In a well known manner, the fluctuations of the potential applied between grid 228 and cathode 226, of the first amplifier stage are reflected in amplified fluctuations of the current flowing in the output circuit.

The fluctuations of current in the output circuit of triode 200 cause a fluctuating potential drop across load resistor 242. The fluctuations of this potential drop across resistor 242 are transmitted through coupling condenser 243 to the input circuit of the second amplifier stage, which includes the triode 201. Triode 201 has an anode 246, a grid 247, and a cathode 248. The input circuit of triode 201 may be traced from the upper terminal of resistor 245 through grid 247, cathode 248, biasing resistor 250 in parallel with a condenser 251, to conductor 234 and the lower terminal of resistor 245.

The output circuit of the second amplifier stage may be traced from the conductor 221, which serves as the positive terminal of the power supply through conductor 235, voltage dividing resistor 236, conductor 237, a conductor 252, condenser 253 and a primary winding 254 of a coupling transformer 255 in parallel therewith, anode 246, cathode 248, biasing resistor 250 and condenser 251 in parallel therewith, and conductor 234 to conductor 219 which serves as the negative terminal of the power supply. In a well known manner, the fluctuations in the potential impressed on the input circuit of triode 201 are reflected in even greater fluctuations in the current flowing in the output circuit.

The output circuit fluctuations flowing in the transformer primary winding 254 produced similar fluctuations in a secondary winding 256 on the transformer 255.

The secondary winding 256 is connected in the input circuit of the final push-pull amplification stage including the twin triode 202. The twin triode 202 comprises a pair of anodes 260 and 261, a pair of control electrodes 262 and 263, each associated with one of the anodes 260 and 261, respectively, and a common cathode 264. The input circuit for the upper half of twin triode 202 may be traced from the upper terminal of secondary winding 256 through a conductor 265, control grid 262, cathode 264, a conductor 266, a resistor 267, and a conductor 268 to the mid-point 257 of transformer secondary winding 256. The input circuit for the lower half of twin triode 202 may be traced from the lower terminal of secondary winding 256 through a conductor 270, control grid 263, cathode 264, conductor 266, resistance 267, and conductor 268 to the center tap 257 of transformer secondary winding 256.

The output circuit of the final push-pull amplification stage is divided into two branches. One of these branches includes the upper half of the twin triode 202, and may be traced from positive terminal 221 of the power supply through a conductor 271, mid-point 272 of primary winding 273 of a transformer 274, the upper half of primary winding 273, a conductor 275, anode 260, cathode 264, conductor 266, and conductor 234 to the negative terminal 219 of the power supply circuit. The other branch of the push-pull output circuit may be traced from positive terminal 221 of the power supply, through conductor 271, mid-point 272, the lower half of transformer primary winding 273, a conductor 276, anode 261, cathode 264, conductor 266 and conductor 234 to negative terminal 219 of the power supply. A condenser 290 is connected across the terminals of transformer primary winding 273 for power factor correction purposes.

The push-pull amplifier stage operates in the conventional manner of such circuits to produce a greatly intensified fluctuation of the current in its output circuit in response to small variations in the potential supplied to its input circuit. This fluctuating output circuit flowing in the transformer primary winding 273 produces similar fluctuations in transformer secondary winding 277, which is connected to the output terminals 286 and 287 of the amplifier 227.

It has been found that amplifiers of the type described herein have a characteristic shift in phase of the fluctuation in the output current with respect to the phase of the fluctuation of the input potential as the magnitude of those fluctuations increases. A certain shift in phase takes place in each stage of the amplifier. The phase shift between the first stage input terminals and the final stage output terminals is the resultant of the individual phase shifts in each stage. When a multiple stage amplifier is used, and the phase shifts of successive stages are in the same sense, a condition may occur wherein the resultant phase shift through the entire amplifier is very high, being greater than 90 electrical degrees and in extreme cases approaching 180 degrees. In the present control system, where the amplifier is to be used in connection with a motor control circuit for a split-phase motor as described, for example, in the system of Figure 1, it is necessary that means be provided for limiting this shift in phase to less than 90 electrical degrees. If means were not provided for limiting the shift in phase, a large fluctuation in the input potential might cause the phase of the output current to shift so much that the direction of rotation of the split-phase motor would be reversed, thereby producing erratic operation of the control system.

We have therefore provided in the amplifier circuit of Figure 2 means for limiting the volume of the final push-pull amplification stage in order that the phase shift of the output may also be limited. This means includes the resistor 267 which is connected in both input circuits of the twin triode 202, and has established across it a potential drop which is proportional in magnitude to the amplitude of the fluctuations applied to control grids 262 and 263. This potential drop is fed back to the input circuit of the first amplification stage. This feed-back circuit may be traced from the left-hand terminal of resistor 267 through a conductor 280, a filtering resistor 281, a conductor 283, a resistor 290, conductor 231, grid 228, cathode 226, resistor 232 and condenser 233 in parallel therewith, and conductor 234 to the right-hand terminal of resistor 267. A filtering condenser 282 is connected between conductors 283 and 234.

The flow of current in the input circuit of the push-pull amplification stage produces a potential drop across resistance 267 such that the right-hand terminal is more positive than the left-hand terminal, as indicated by the legend in the drawings. The left-hand terminal of resistor 267 is connected through the circuit described above to control grid 228, while the right-hand terminal of resistor 267 is connected to the cathode 226. It should therefore be apparent that as the output of the amplifier increases, the potential drop across resistor 267 increases and an increasing negative bias is applied to grid 228. This negative bias produces a counter-active effect tending to reduce the output of the amplifier. By properly proportioning the circuit elements, such as resistor 267, this negative bias effect may be made to definitely limit the amplifier output at some predetermined value, thereby limiting the shift in phase of the output current with respect to the input potential.

This limiting of the amplifier output current does not adversely effect the motor control system shown in Figure 1. The only effect which might possibly be considered adverse is a limitation of the speed of that motor. Since the distance which the motor may run in a given direction is limited by the movement of the valve 20 and the slider 45, the speed of the motor, even though limited, may be designed to be ample to run the valve and slider to either of their limiting positions within an inconsequential period of time after a complete unbalance of the bridge circuit in either direction.

Figure 3

Figure 3:
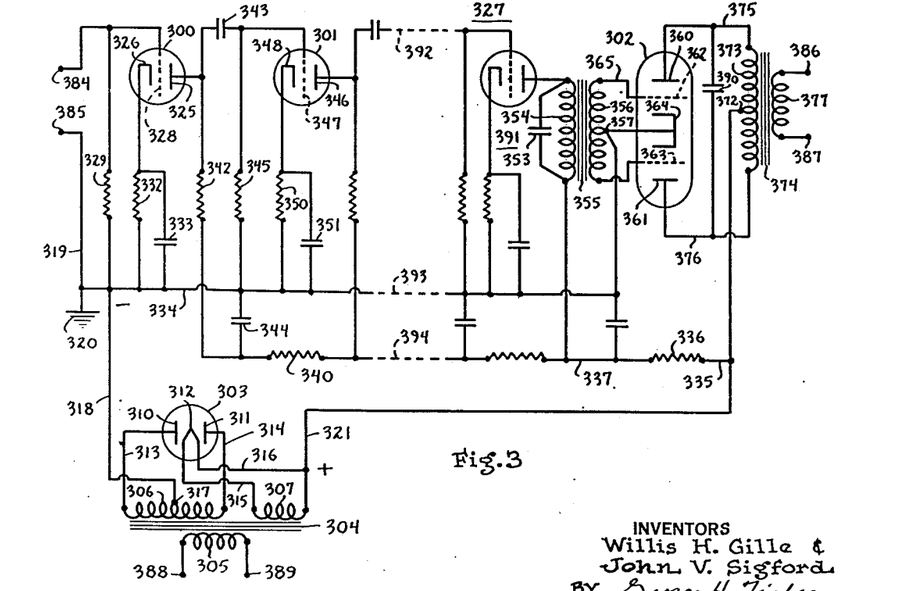
Figure 3 represents a modified form of electronic amplifier circuit which is also applicable to the system of Figure 1.

Figure 3 illustrates another form of electronic amplifier which may be used in the control system of Figure 1. The amplifier shown in Figure 3 is generally similar to that in Figure 2 and is indicated by the reference number 327. All elements in Figure 3 which are the equivalent of corresponding elements in Figure 2 bear reference numerals in the 300 series which correspond to the reference numerals of the equivalent elements in Figure 2 in the 200 series. For example, input terminal 284 in Figure 2 is the equivalent of input terminal 384 in Figure 3.

The chief feature of novelty in Figure 3 is that the volume control arrangement including the resistor 267 and the feed-back circuit associated therewith, has been eliminated. It should also be noted that the filtering condenser 222 has been removed from the power supply circuit in Figure 3.

By way of example, a third stage of preliminary amplification, generally indicated at 391, has been added to the circuit of Figure 3. The possible addition of further preliminary stages is indicated by the dotted lines 392, 393 and 394. The additional stage 388 is the equivalent of the other stages including the triodes 300 and 301, and needs no further description.

Elimination of undesirable phase shifts between the input and output terminals of the amplifier 327 has been accomplished by a much simpler means than the volume control arrangement shown in Figure 2. The replacement of the reactive coupling condenser 230 in Figure 2 by the resistance coupling element 329 in Figure 3 has been found to decrease the tendency of the system to shift the phase of the output. The phase shifting tendencies of the system have been further reduced by elimination of the filtering condenser 222. As a result of the elimination of this filtering condenser, an alternating component having twice the frequency of the primary power source exists between the terminals 318 and 321 of the power supply circuit. This double frequency component is in phase with the primary power supply potential. It should be noted that this power supply including the double frequency component is connected to the push-pull amplification stage through conductors 321 and 334 without any filtering whatsoever. As long as the current flowing in the output circuit of the push-pull amplification stage remains in phase or 180 degrees out of phase with the primary supply voltage, this double frequency component has substantially no effect. The double frequency component aids the output in one half of the push-pull stage while it opposes the output in the other half. These two effects substantially cancel each other.

If the output current in the final stage shifts in phase with respect to the double frequency component, however, it opposes the shift in both halves of the push-pull stage, and thereby tends to stabilize the phase of the output current. It should therefore be apparent that the use of unfiltered current from the rectifier provides a means of preventing undesired shifts in the phase of the output current.

Figure 4

Figure 4:
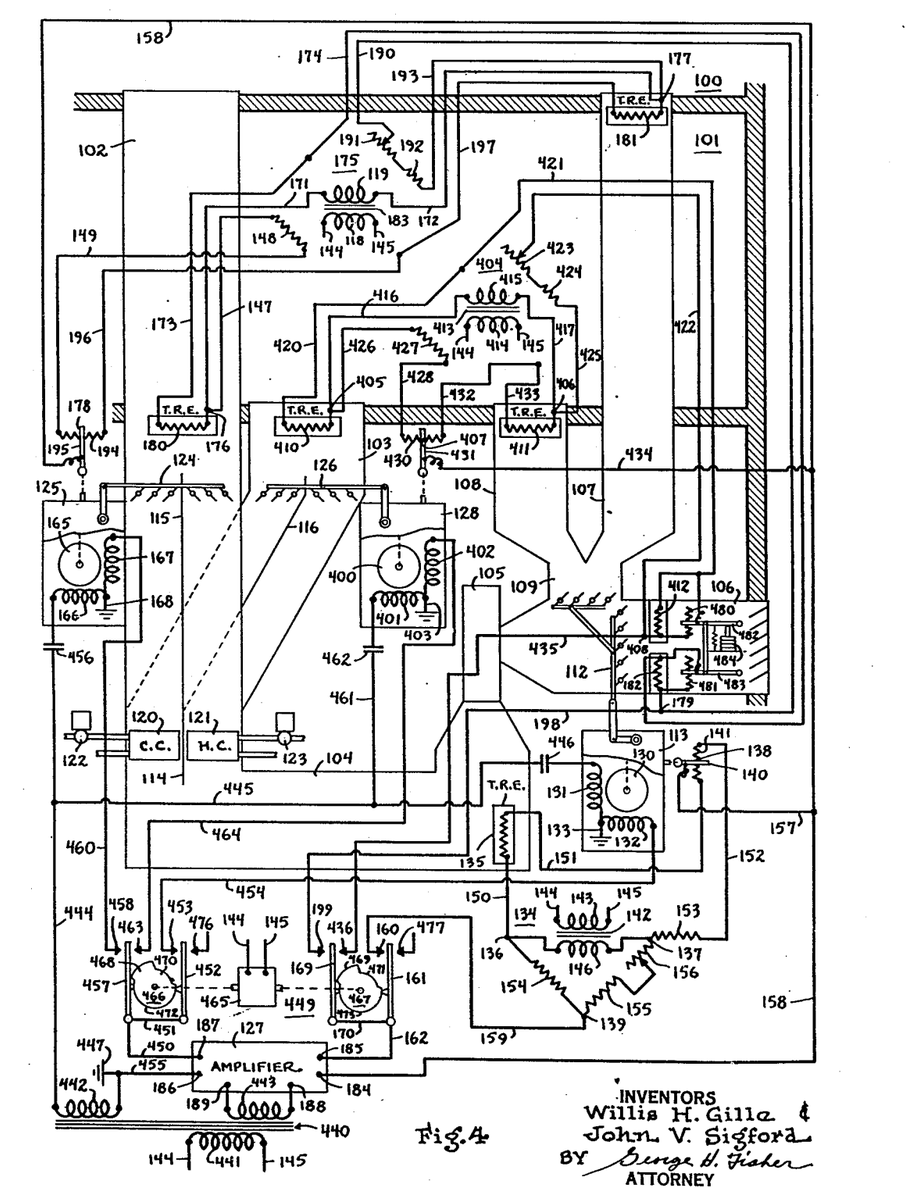
Figure 4 shows an air conditioning system embodying certain features of my invention.

Figure 4 discloses a system for supplying air to and controlling the temperature of a pair of zones 100 and 101. Conditioned air is supplied to the zone 100 through a duct 102, while conditioned air is supplied to the zone 101 through a duct 103. The ducts 102 and 103 are joined to form a common supply duct 104.

Air is forced through the supply duct 104 by a fan schematically indicated at 105. Fresh air may be drawn from the outside of the building in which zones 100 and 101 are located through a supply duct 106 to the intake of fan 105. The air in the zones 100 and 101 may be drawn through return air ducts 107 and 108, respectively. The ducts 107 and 108 join to form a common return air duct 109 which is also connected to the intake of the fan 105.

The relative proportions of fresh and recirculated air which are supplied to the fan intake are controlled by mixing dampers 112 operated by a motor mechanism 113.

The motor mechanism 113 includes a motor 130 of the split-phase type having a pair of windings 131 and 132, whose common terminal 133 is connected to ground. Operation of motor 130 is controlled in accordance with the unbalance of a bridge circuit generally indicated at 134 and including a temperature responsive resistance element 135 exposed to the temperature of the air near the point of discharge from the fan 105.

Bridge circuit 134 has input terminals 136 and 137 and output terminals 138 and 139. Output terminal 138 is the point of engagement of a slider 140 with a slide wire resistance 141. Slider 140 is moved along slide wire 141 by operation of motor 130 so that the position of slider 140 is varied in accordance with the position of mixing dampers 112.

Electrical energy is supplied to the bridge circuit 134 by a transformer 142 having a primary winding 143 connected to suply lines 144 and 145 and a secondary winding 146 connected to bridge input terminals 136 and 137.

The upper left-hand arm of bridge circuit 134 connects input terminal 136 with output terminal 138, and includes a conductor 150, temperature responsive resistance element 135, a conductor 151, and that portion of slide wire resistance 141 between its lower terminal and output terminal 138. The upper right-hand arm of bridge circuit 134 connects output terminal 138 with input terminal 137 and includes that portion of resistance 141 between output terminal 138 and the upper terminal of resistance 141, a conductor 152, and a fixed resistance 153.

The lower left-hand arm of bridge circuit 134 connects input terminal 136 with output terminal 139 and includes a fixed resistance 154. The lower right arm of bridge circuit 134, which connects output terminal 139 with input terminal 137, includes a fixed resistance 155 and a variable resistance 156. The function of variable resistance 156 is to determine the value of temperature adjacent sensitive element 135 which causes the bridge circuit to be balanced. Output terminal 138 is connected through conductors 157 and 158 to input terminal 184 of an amplifier 127. Output terminal 139 is connected through a conductor 159, a stationary contact 160, a movable switch arm 161, and a conductor 162 to the other input terminal 185 of amplifier 127.

A transformer 440 has a primary winding 441 connected to supply lines 144 and 145, and a pair of secondary windings 442 and 443. Secondary winding 443 is connected to amplifier power supply terminals 188 and 189.

The right-hand terminal of winding 442 is grounded, as at 447. Winding 442 supplies electrical energy to winding 131 of motor 130. Winding 131 is continuously energized through a circuit which may be traced from the left-hand end of secondary 442 through conductors 444 and 445, a condenser 446, winding 131, and ground connections 133 and 447 to the right-hand terminal of secondary 442.

Winding 132 may be energized by the output current of amplifier 127. The energizing circuit for winding 132 may be traced from amplifier output terminal 187, through conductors 450 and 451, a switch arm 452, a stationary contact 453, a conductor 454, winding 132, ground connections 133 and 447, and a conductor 455 to amplifier output terminal 186.

Switch arms 161 and 452 are operated by an actuating mechanism generally indicated at 449, to be described later, so as to engage contacts 160 and 453, respectively, at the same time. By this mechanism, bridge circuit 134 is connected to the amplifier input circuit when winding 132 of motor mechanism 113 is connected to the amplifier output circuit.

The common supply duct 104 is separated longitudinally by a partition 114. Where the duct 104 separates into the zone supply ducts 102 and 103, the partition 114 divides into corresponding partitions 115 and 116, each of the latter continuing in the zone supply ducts 102 and 103, respectively. On opposite sides of the partition 114 in the common duct 104 are mounted a cooling coil 120 indicated by the legend C. C. in the drawings, and a heating coil 121 indicated by the legend H. C. in the drawings. The cooling coil 120 is supplied with cooling fluid through a valve 122, which may be controlled in any suitable manner. The heating coil 121 is similarly supplied with heating fluid through a valve 123, which may be controlled in any desirable manner. The air cooled by the cooling coil 120 flows through the ducts 104, 102 and 103 on the left-hand side of the partitions 114, 115 and 116, respectively. On the other hand, air heated by the heating coil 121 flows through the ducts 102, 103 and 104 on the right-hand side of the partitions 115, 116 and 114, respectively.

The relative amounts of heated and cooled air supplied to zone 100 are controlled by a mixing damper 124 which is operated by a motor mechanism 125. The relative amounts of heated and cooled air supplied to the zone 101 are controlled by a mixing damper 126 operated by a motor mechanism 128.

Motor mechanism 125 includes a motor 165 of the split-phase type, having a pair of windings 166 and 167 whose common terminal is grounded as at 168. Operation of motor 165 is controlled by a bridge circuit generally indicated at 175, having input terminals 176 and 177 and output terminals 178 and 179. Bridge circuit 175 includes a first temperature responsive resistance element 180 exposed to the air temperature in the discharge duct 102, a second temperature responsive element 181 exposed to the temperature in the return air duct 107, and a third temperature responsive element 182 located in the fresh air supply duct 106.

Electrical energy is supplied to bridge circuit 175 by a transformer 183 having a primary winding 118 connected to supply lines 144 and 145, and a secondary winding 119 connected to input terminals 176 and 177 by conductors 171 and 172, respectively.

The upper left arm of the bridge circuit 175 connects input terminal 176 with output terminal 179 and includes temperature responsive resistance element 180, a conductor 173, a conductor 174, and temperature responsive resistance element 182.

The upper right-hand arm of bridge circuit 175 connects output terminal 179 with input terminal 177 and includes a conductor 190, a variable resistance 191, a fixed resistance 192, and a conductor 193.

The lower left arm of bridge circuit 175 connects input terminal 176 with output terminal 178 and includes a conductor 147, a fixed resistance 148, a conductor 149, and that portion of a slide wire resistance 194 between the left-hand terminal and output terminal 178. Output terminal 178 is the point of contact between a slider 195 and slide wire 194. Slider 195 is moved along slider 194 by motor 165 as the latter moves mixing dampers 124. The position of slider 195 therefore serves as a measure of the position of dampers 124.

The lower right arm of bridge circuit 175 connects output terminal 178 with input terminal 177 and includes that portion of the resistance wire 194 to the right of output terminal 178, a conductor 196, a conductor 197, and temperature responsive resistance element 181.

Output terminal 178 is connected to input terminal 184 of amplifier 127 by means of conductor 158. Output terminal 179 is connected to input terminal 185 of amplifier 127 through conductor 198, stationary switch contact 199, a switch arm 169, and conductors 170 and 162.

Transformer secondary winding 442 supplies energy continuously to winding 166 of motor 165. The energizing circuit may be traced from the left-hand end of secondary 442 through conductor 444, a condenser 456, winding 166, and ground connections 168 and 447 to the right hand end of winding 442.

Winding 167 may be energized by the output current of amplifier 127. The energizing circuit for winding 167 may be traced from amplifier output terminal 187 through conductor 450, a switch arm 457, a contact 458, a conductor 460, winding 167, ground connections 168 and 447, and conductor 455 to amplifier output terminal 186.

Switch arms 169 and 457 are operated by actuating mechanism 449 so as to engage contacts 199 and 458, respectively, at the same time. When the switch arms 169 and 457 are engaging contacts 199 and 458, respectively, bridge circuit 175 is connected to the amplifier input circuit and winding 167 of motor 165 is connected to the amplifier output circuit.

Motor mechanism 128 includes a motor 400 of the split-phase type having a pair of windings 401 and 402 with their common terminal 403 grounded. Operation of motor 400 is controlled by a bridge circuit 404, having input terminals 405 and 406 and output terminals 407 and 408. Bridge circuit 404 includes a first temperature responsive resistance element 410 exposed to the temperature in the discharge duct 103, a second temperature responsive resistance element 411 exposed to the temperature in return air duct 108, and a third temperature responsive resistance element 412 exposed to the temperature in fresh air supply duct 106.

Electrical energy is supplied to the bridge circuit 404 by a transformer 413, having a primary winding 414 connected to supply lines 144 and 145, and a secondary winding 415 connected to input terminals 405 and 406 by conductors 416 and 417, respectively.

The upper left-hand arm of bridge circuit 404 connects input terminal 405 with output terminal 408 and includes temperature responsive resistance element 410, a conductor 420, a conductor 421, and temperature responsive resistance element 412.

The upper right-hand arm of bridge circuit 404 connects output terminal 408 with input terminal 406 and includes a conductor 422, a variable resistor 423, a fixed resistor 424, and a conductor 425.

The lower left-hand arm of bridge circuit 404 connects input terminal 405 without terminal 407 and includes a conductor 426, a fixed resistance 427, a conductor 428, and that portion of a slide wire resistance 430 to the left of the point of engagement of a slider 431 therewith. This point of engagement constitutes the output terminal 407 of bridge circuit 404. The slider 431 is moved along slide wire resistance 430 by operation of motor 400, so that the position of slider 431 serves as an indication of the position of damper 126.

The lower right-hand arm of bridge circuit 404 connects output terminal 407 with input terminal 406 and includes that part of slide wire resistance 430 to the right of slider 431, conductors 432 and 433, and temperature responsive resistance element 411.

Output terminal 407 of bridge circuit 404 is connected to input terminal 184 of amplifier 127 through a conductor 434 and conductor 158. Output terminal 408 of bridge 404 is connected to amplifier input terminal 185 through a conductor 435, a switch contact 436, a switch arm 169, and conductors 170 and 162.

Transformer secondary winding 442 supplies energy continuously to winding 401 of motor 400. The energizing circuit may be traced from the left-hand end of secondary 442 through conductors 444 and 445, a conductor 461, a condenser 462, winding 401, and ground connections 403 and 447 to the right-hand terminal of secondary winding 442.

Winding 402 may be energized by the output current of the amplifier 127. The energizing circuit for winding 402 may be traced from amplifier output terminal 187 through conductor 450, switch arm 457, contact 463, a conductor 464, winding 402, ground connections 403 and 447 and conductor 455 to amplifier output terminal 186.

Switch arms 169 and 451 are operated by actuating mechanism 449 so as to engage contacts 436 and 463, respectively, at the same time. When the switch arms 169 and 451 are engaging contacts 436 and 463, respectively, bridge circuit 404 is connected to the amplifier input circuit and winding 402 of motor mechanism 128 is connected to the amplifier output circuit.

Switch actuating mechanism 449 includes a continuously operating motor 465 which may be connected to power supply lines 144 and 145. Motor 465 drives a pair of similar cams 466 and 467. Cam 466 cooperates with switch arms 452 and 457, thereby controlling the connection of the various motors to the amplifier output circuit. Cam 467 cooperates with switch arms 161 and 169, thereby controlling the connection of the various bridge circuits to the amplifier input. Each switch arm is biased for engagement with its associated cam.

Cams 466 and 467 have corresponding high dwell portions 468 and 469, low dwell portions 470 and 471, and intermediate dwell portions 472 and 473. The cams rotate simultaneously. When the high dwell portions 468 and 469 engage switch arms 457 and 169 respectively, those switch arms are moved into engagement with contacts 458 and 199. When the low dwell portions 470 and 471 engage switch arms 457 and 169, the latter engage contacts 463 and 436 respectively. When the intermediate dwell portions 472 and 473 engage switch arms 457 and 169, the switch arms are held in an intermediate position, engaging neither of their respective contacts. In a similar manner, switch arms 452 and 161 are simultaneously operated to engage contacts 453 and 160. Contacts 476 and 477 are provided adjacent the switch arms 452 and 161 respectively, so that another condition responsive bridge circuit and an associated condition controlling motor could be added to the system if desired.

A variable resistance 480 is connected in parallel with temperature responsive element 412, and a similar variable resistance 481 is connected in parallel with temperature responsive element 182. Resistances 480 and 481 are of the slide wire type. Their effective values are varied by a pair of sliders 482 and 483 which are mechanically interconnected so as to be operated by a single temperature responsive device 484, shown in the drawings as a bellows, is exposed to the temperature in the fresh air intake 106 wherein the temperature responsive resistance elements 412 and 182 are mounted.

The function of temperature responsive resistance elements 412 and 182 is to compensate their respective bridge circuits for the temperature of the fresh air admitted to the system. The purpose of this compensation is to provide, during extremely hot weather, an increase in the indoor temperature in proportion to the increase in outdoor temperature. Such compensation has two distinct advantages. In the first place, such compensation prevents the occurrence of an excessive difference between indoor and outdoor temperatures which might cause undue shock to persons entering or leaving the building. In the second place, such compensation provides for more economical operation of the cooling system. It has been found that when the outdoor temperature is 100°, for example, people are sufficiently comfortable when the indoor temperature is maintained at 85°. On the other hand, when the outdoor temperature is 85°, the same people will require that the indoor temperature be maintained at 75° in order to secure the same comfort. Therefore by operating the system at 85° when the outdoor temperature is at 100°, rather than maintaining the inside temperature constantly at 75°, a considerable saving in the amount of energy necessary to cool the interior of the building is secured.

This compensation for outdoor temperature should not be present when the outdoor temperature is below a certain value, for example 75°. Furthermore, the amount of compensation should vary with the outdoor temperature. That is, a change in outdoor temperature from 75 to 80° should not cause as great a change in the control point of the inside temperature as a change in outdoor temperature from 95 to 100°. We have taken care of these changes in compensation by introducing the variable resistances 480 and 481. The sliders 482 and 483 are operated by the bellows 484 so that they are at the lower end of their associated resistances whenever the outside temperature is lower than 75°. The resistances 412 and 182 will therefore be shunted from their respective bridge circuits at such a time. As the outdoor temperature increases above 75° the sliders 482 and 483 move upward along their associated resistances 480 and 481. Thus as the temperature increases an increasing amount of resistance is inserted in parallel with the elements 412 and 182. A given change in resistance of these latter elements therefore has an increasing effect on the unbalance of the system. When the sliders 482 and 483 reach the upper end of their slide wires, there is no further change in the amount of compensation of the inside temperature for each degree change in the outside temperature. After such a condition is reached, the change of outdoor temperature affects only the elements 412 and 182, and the compensation of the bridge circuit depends only on the temperature coefficient of resistance of those elements.

It should be apparent that the mechanism just described provides a non-linear compensation of the bridge circuit, varying from zero at values below 70°, through a range from, for example, 70° to 100°, where the rate of compensation increases with temperature to a second range, for example, above 100° where the rate of compensation is constant.

*Operation of Figure 4*

In describing the operation of the air conditioning system shown in Figure 4, the bridge circuit 134 and its control of the mixing dampers 112 will first be described.

Let it be assumed that the motor 465 is stopped in such a position that switch arms 452 and 161 are in engagement with contacts 453 and 160, respectively. Motor winding 132 is then connected to the output circuit of amplifier 127 and bridge circuit 134 is connected to the input circuit of amplifier 127. Variations in the balance of bridge circuit 134 caused by changes in the temperature adjacent sensitive element 135 then produce unbalance potentials in the bridge circuit which are applied to the input terminals of the amplifier. The output of the amplifier is fed to winding 132 so as to cause rotation of the motor 130 in the proper direction to move slider 140 in such a direction as the rebalance bridge circuit 134. As the slider 140 is moved, the mixing dampers 112 are simultaneously moved so as to change the proportions of fresh air and recirculated air supplied to the system. The change in position of dampers 112 will be in such a direction as to correct the air temperature in the duct 104, returning it to the value which the system was set to maintain by adjustment of the variable resistance 156.

For example, under summer conditions the outside air supplied through the duct 106 will normally be at a higher temperature than the recirculated air supplied through the duct 109. It is desired to maintain the air in the duct 104 at a predetermined temperature so that too great a load will not be placed on the cooling coil 120. By adjusting resistance 156 the bridge circuit 134 may be made to balance at any predetermined temperature adjacent the sensitive resistance element 135. If the temperature in the duct 104 should increase above this value the increase in resistance of element 135 causes a current to flow in the amplifier input circuit, thereby producing a current in the amplifier output which energizes winding 132. The phase relation of this current will be such as to operate motor 130 in the proper direction to drive slider 140 downwardly along resistance 141, thereby reducing the resistance in the upper left arm of bridge circuit 134 and rebalancing the bridge circuit. At the same time the dampers 112 will be operated in such a direction as to decrease the supply of relatively hot outside air and increase the supply of relatively cool recirculated air, thereby tending to return the temperature in duct 104 to its predetermined value.

In a similar manner, a fall in temperature in the duct 104 causes operation of the dampers 112 to increase the supply of relatively warm outside air and decrease the supply of relatively cool recirculated air.

Since the temperature of the outside air in the winter will be normally colder than that of the inside air, this control may be reversed in the winter so as to increase the proportion of recirculated air when the temperature in duct 104 decreases, and to increase the proportion of fresh air when the temperature in duct 104 increases. This reversal of function may be produced in any desired manner. By way of example, one way of accomplishing this result would be to reverse the ungrounded terminal connections of motor winding 132. It will be readily understood by those skilled in the art that suitable means may be provided to establish a suitable minimum position of the fresh air dampers 112.

The operation of bridge circuit 175 and the motor mechanism 125 controlled thereby will next be described. For this purpose let it be assumed that motor 465 is stopped in such a position that switch arms 457 and 169 are engaging contacts 458 and 199 respectively, thereby connecting motor 165 to the output circuit of the amplifier and connecting bridge 175 to the amplifier input circuit. Bridge 175 includes three temperature responsive elements 180, 181 and 182. Temperature responsive element 180 is exposed to the temperature of the air being discharged into the space 100 through the duct 102. Temperature responsive element 181 is responsive to the temperature of the air being returned from the space 100 to the air conditioning system through the duct 107. Temperature responsive element 182 is exposed to the fresh air being supplied to the system through the duct 106.

A decrease in resistance of any one of these temperature responsive elements indicates a present or impending decrease in the temperature of space 100. Since both elements 181 and 180 are connected in the upper left arm of the bridge, while the resistance 182 is connected in the opposite lower right arm of the bridge, an increase in resistance of any one produces an unbalance of the bridge circuit in the same direction. Such an unbalance produces a current flow in the amplifier input circuit which is reflected in an increased flow in the amplifier output circuit in such a direction that motor 165 operates dampers 124 so as to decrease the supply of cooled air and/or increase the supply of heated air, as the case may be. At the same time slider 195 is driven to the right along slide wire 194 so as to rebalance the bridge circuit 175.

In a similar manner a decrease in temperature of any one of the resistance elements 180, 181 or 182 causes operation of the motor 165 in such a direction as to operate mixing dampers 124 to increase the supply of heated air or decrease the supply of cooled air. Simultaneously slider 195 is driven to the left along resistance 194 to rebalance bridge circuit 175.

Bridge circuit 404 is provided with temperature responsive elements 410, 411 and 412 which correspond to the resistance elements 180, 181 and 182 in bridge circuit 175. Bridge circuit 404 acting through motor mechanism 128 controls the air supply to zone 101 in the same manner that bridge circuit 175 controls the supply of air to zone 100. Further description of the operation of bridge circuit 404 is believed to be unnecessary.

It has been found that in a control system of the type described, if the bridge is continuously connected to the condition controlling motor, the motor will operate only during about five minutes out of every hour. Since amplifier circuits of the type necessary in our motor control system are quite expensive, we have provided a switching mechanism which takes advantage of this operating characteristic so that a single amplifier may be used to connect successively various bridge circuits to their associated motors. This arrangement may be used in any control system as long as the number of control circuits is kept small in proportion to the average proportion of time each control motor would run if continuously connected to its amplifier. For instance, in the present system it has been stated that each control motor would run approximately five minutes out of every hour if continuously connected to an amplifier. Therefore, since each control motor runs approximately one-twelfth of the time the number of control circuits which may be used on one amplifier should be made smaller than twelve. It has been found that four is a satisfactory number and provides a sufficient factor of safety to take care of any unusual conditions which may arise.

While we have shown and described preferred embodiments of the various features of our invention, other modifications will readily occur to those skilled in the art, and we therefore wish to be limited only by the scope of the appended claims.

We claim as our invention:

1. A system for controlling the temperature of the air in a space, comprising in combination, temperature changing means, return duct means for conveying air from said space to said temperature changing means, fresh air duct means for conveying outside air to said temperature changing means, discharge duct means for conveying air from said temperature changing means to said space, damper means in said discharge duct, motor means for operating said damper means, a resistance bridge circuit having a first element with an appreciable temperature coefficient of resistance and exposed to the air temperature in said return duct, a second element with an appreciable temperature coefficient of resistance and exposed to the air temperature in said fresh air duct, and a third element with an appreciable temperature coefficient of resistance and exposed to the air temperature in said discharge duct, means for applying an alternating voltage to said bridge circuit, and means responsive to the phase relationship between the output voltage of said bridge and said first named alternating voltage for controlling said motor.

2. In an air conditioning system for a space, in combination, air conditioning means, means for mixing and circulating air through said conditioning means, return air duct means for conveying air from said space to said circulating means, fresh air duct means for conveying outside air to said circulating means, damper means for proportioning the relative amounts of air passing through said fresh air and return air ducts, motor means for operating said damper means, a resistance bridge circuit having an element with an appreciable temperature coefficient of resistance exposed to the temperature of the air discharged from said mixing and circulating means, means for applying an alternating voltage to said bridge circuit, and means responsive to the phase relationship between the output voltage of said bridge and said first named alternating voltage for controlling said motor.

3. In an air cooling system, in combination, duct means for supplying outside air to said system, air cooling means, control means for said air cooling means, means for operating said control means including a bridge circuit, a first element in said circuit having an appreciable temperature coefficient of resistance and exposed to a temperature indicative of the need for operation of said control means, a second element in said circuit having an appreciable temperature coefficient of resistance and exposed to the air temperature in said duct means, said element compensating said circuit for variations in said last-mentioned air temperature, a rheostat connected in parallel with said second element to limit its compensating effect, and means responsive to said last-mentioned air temperature for operating said rheostat.

4. In an air cooling system, in combination, duct means for supplying outside air to said system, air cooling means, electrical motor means for operating said air cooling means selectively in opposite senses in accordance with the phase of an electrical potential supplied thereto, an electronic amplifier including an input circuit and an output circuit and having a predetermined normal phase relationship between potentials in said output circuit and said input circuit, means connected to said amplifier for substantially preventing a disturbance of said normal phase relationship, connections between said output circuit and said motor means, a source of alternating electrical energy, a bridge circuit having input terminals and output terminals, a first element in said bridge circuit having an appreciable temperature coefficient of resistance and exposed to a temperature indicative of the need for operation of said control means, a second element in said bridge circuit having an appreciable temperature coefficient of resistance and exposed to the temperature in said duct means, said elem compensating said circuit for variations in last-mentioned air temperature, a rheostat c nected in parallel with said second elemen limit its compensating effect, means responsiv said last-mentioned air temperature for ope ing said rheostat, and a connection between output terminals and said amplifier input cir 5. A temperature control system comprisin combination, a bridge circuit including an ment of fixed length whose specific resist changes with temperature and which is exp to a temperature condition affecting said sys an adjustable resistance so connected in par with said element across the extremities the that the adjustment of said resistance varies resistance in parallel with the terminals of element, a thermostatic device responsive to same temperature to which said element is posed for adjusting said resistance, tempera changing means, and means responsive to balance of said bridge circuit for controlling temperature changing means.

6. In a temperature responsive electrical work, a first element whose specific resist changes with temperature and which is exp to a first temperature, said element being nected in said network so as to produce unbal potentials in said network in accordance changes in said first temperature, a second ment connected in said network and whose cific resistance changes with temperature which is exposed to a second temperature so compensate said unbalance potentials in acc ance with changes in said second temperatu rheostat comprising a resistance element a slider in movable engagement with said resist element, one terminal of said second element ing connected to one terminal of the resist element of the rheostat and the other term being connected to said slider, and thermos means exposed to said second temperature moving said slider so as to vary said com sation.

7. An air conditioning system for an enclos comprising in combination, air conditio means, discharge duct means for conveying from said air conditioning means to said en sure, supply duct means for conveying air to air conditioning means, return duct means conveying air from said enclosure to said su duct means, fresh air duct means for conve air from the outside of said enclosure to supply duct means, first damper means for trolling the flow of air through said disch duct means, first and second bridge circ means including a source of potential for e gizing said first and second bridge circuits, electrical motor means for operating said damper means selectively in opposite sense accordance with the phase relation betweer electrical potential supplied therethrough said source of potential, said first bridge cir including three elements having appreciable t perature coefficients of resistance, one of said ments being located in said discharge duct me a second in said return duct means, and third in said fresh air duct means, second dan means for controlling the proportions of re air and fresh air entering said supply duct me second electrical motor means for operating second damper means selectively in opposite rections in accordance with the phase relation tween an electrical potential supplied thereto said source of potential, said second bridge circuit including an element having an appreciable temperature coefficient of resistance and located in said supply duct means, and means including electronic amplifier means for connecting said first and second bridge circuits respectively with said first and second motor means to supply to said motor means electrical potentials whose phase relationship with respect to said source is dependent upon the direction of unbalance of said bridge circuits.

8. Control apparatus, comprising in combination, a load device to be controlled, an electrical network, means responsive to an electrical potential in said network for controlling said load device, and means for producing in said network an electrical potential variable as a non-linear function of a condition indicative of the need for operation of said load device, said last-named means comprising first impedance means connected in said network and variable as a substantially linear function of said condition and second impedance means, each of said first and second impedance means including an impedance element, one terminal of the impedance element of said second impedance means being connected to one terminal of the impedance element of said first impedance means, said second impedance means having a movable tap connected to the other terminal of the impedance element of said first impedance means and movable with respect to the impedance element of said second impedance means as a substantially linear function of said condition simultaneously with a change in the impedance value of said first impedance means.

WILLIS H. GILLE.
JOHN V. SIGFORD.